United States Patent [19]

Youens

[11] Patent Number: 5,764,474

[45] Date of Patent: Jun. 9, 1998

[54] PORTABLE COMPUTER WITH TILTING KEYBOARD THAT EXPOSES POINTING DEVICE

[75] Inventor: John E. Youens, Magnolia, Tex.

[73] Assignee: Compaq Computer Corporation, Houston, Tex.

[21] Appl. No.: 810,520

[22] Filed: Mar. 3, 1997

[51] Int. Cl.[6] .................. G06F 1/16; H05K 5/02
[52] U.S. Cl. .................. 361/680; 400/682; 345/169
[58] Field of Search .................. 361/680, 681; 345/168, 169; 400/489, 682; 235/145 R; 364/708.1; G06F 1/16

[56] References Cited

U.S. PATENT DOCUMENTS

| | | | |
|---|---|---|---|
| 5,168,427 | 12/1992 | Clancy et al. | 361/680 |
| 5,490,036 | 2/1996 | Lin et al. | 361/680 |
| 5,490,037 | 2/1996 | Clancy | 361/680 |
| 5,526,226 | 6/1996 | Katoh et al. | 361/680 |
| 5,539,615 | 7/1996 | Sellers | 361/680 |
| 5,546,334 | 8/1996 | Hsieh et al. | 364/709.11 |
| 5,572,399 | 11/1996 | Shirato et al. | 361/680 |

*Primary Examiner*—Lynn D. Feild
*Attorney, Agent, or Firm*—Konneker & Smith

[57] ABSTRACT

A portable notebook computer has a base housing with a keyboard structure movably supported on its top side. The keyboard structure is movable relative to the base housing between a forwardly disposed, generally horizontal storage and transport orientation and a rearwardly shifted use orientation in which the keyboard structure is upwardly and rearwardly tilted. When the keyboard structure is in its storage and transport orientation a front side portion thereof covers an underlying pointing device, representatively a trackball device. When the keyboard structure is rearwardly shifted to its use orientation it uncovers the pointing device for operation by the computer user. Due to this vertical stacking of the keyboard structure and pointing device, the front-to-rear dimension of the computer base housing may be advantageously reduced. Additionally, due to the rearwardly and upwardly tilted use orientation of the keyboard structure its user operating comfort is enhanced.

18 Claims, 3 Drawing Sheets

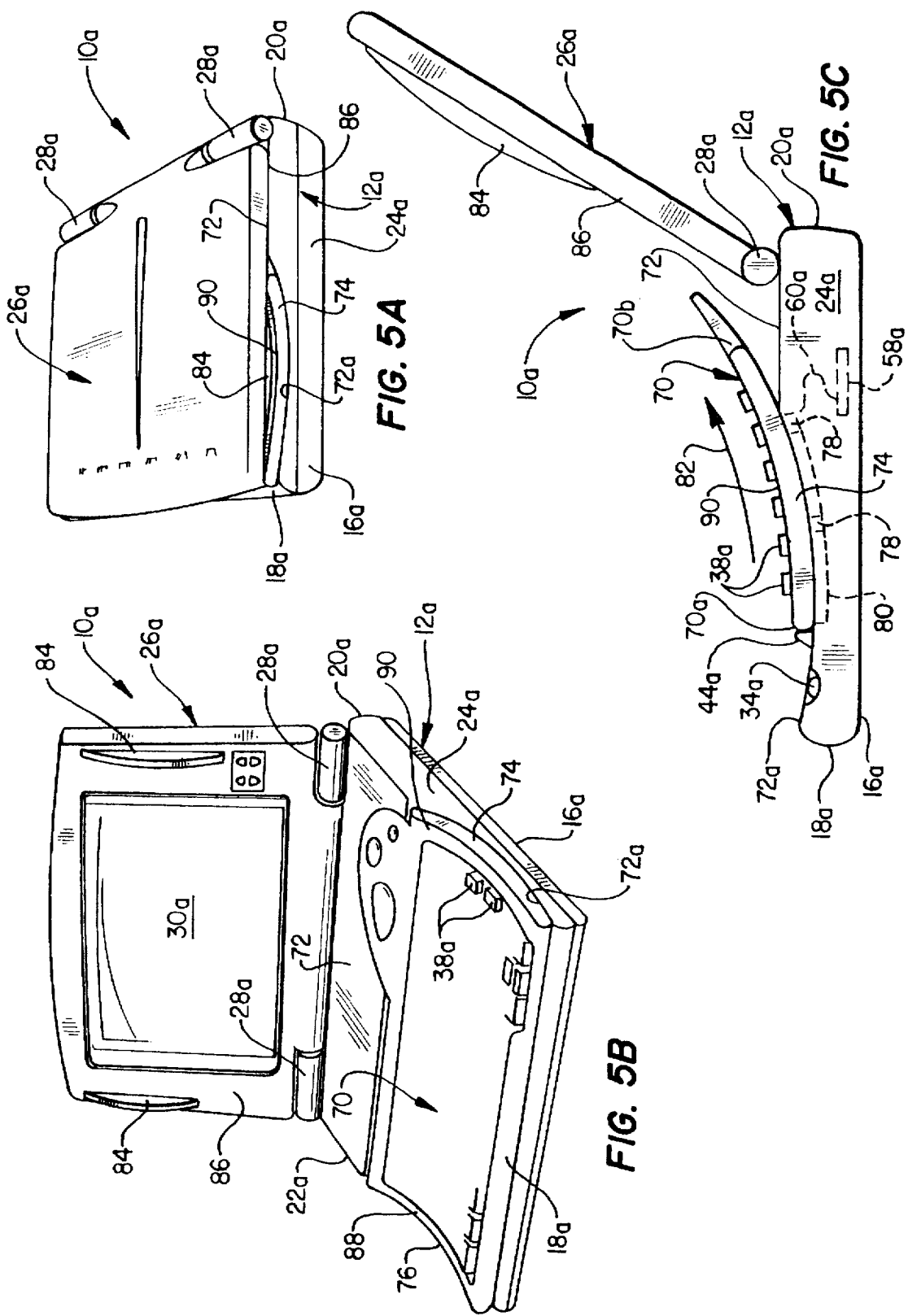

PORTABLE COMPUTER WITH TILTING KEYBOARD THAT EXPOSES POINTING DEVICE

BACKGROUND OF THE INVENTION

1. Field of the Invention

The present invention generally relates to computer apparatus and, in a preferred embodiment thereof, more particularly relates to keyboard structures used on portable computers such as notebook computers.

2. Description of Related Art

As conventionally constructed a notebook computer typically comprises a base housing portion on the top side of which a fixed position keyboard structure is mounted, and a somewhat thinner lid housing in which a display screen is operatively carried. The lid housing is pivotally secured to a rear top side edge portion of the base housing for pivotal movement relative thereto between a storage and transport orientation in which the lid housing is generally parallel to the top side of the base housing and covers the keyboard structure, and an upwardly pivoted generally vertical use orientation that operatively exposes the display screen to user view.

A pointing device, such as a trackball or touchpad structure, is typically mounted on the top side of the base housing in front of the keyboard structure, in the same general plane therewith, and is stacked above other base housing components at a front side portion of the base housing. The pointing device is manually operable by the computer user to controllably reposition a movable cursor on the display screen.

Two primary disadvantages are presented by this conventional positional relationship between the keyboard structure and the pointing device. First, a significant front-to-rear base housing dimension, and thus a front-to-rear overall computer dimension, is required to mount both the keyboard structure and the pointing device on the top of the base housing in this conventional spatial relationship between these two computer components. The vertical footprint of this otherwise compact computer design is thus undesirably increased.

Second, the conventional necessity of mounting the pointing device and the keyboard in the same general horizontal plane tends to create a palm rest and pointing device area along the front side of the base housing which is higher than optimum from an ergonomic standpoint.

From the foregoing it can be readily seen that it would be desirable to provide an improved portable notebook computer in which these problems arising from the above-described conventional spatial relationship between the pointing device and keyboard structure portions of the computer are eliminated or at least substantially reduced. It is accordingly an object of the present invention to provide such an improved portable notebook computer.

SUMMARY OF THE INVENTION

In carrying out principles of the present invention, in accordance with a preferred embodiment thereof, electronic apparatus is provided which is preferably in the form of a portable notebook computer and comprises a base housing having a top side with front and rear portions. A user operable control structure, representatively a pointing device useable to controllably reposition a cursor on a display screen portion of the computer, is disposed on the front portion of the top base housing side.

According to a primary feature of the invention, a keyboard structure is supported on the top side of the base housing for movement relative thereto between (1) a forwardly shifted storage and transport orientation in which a front side portion of the keyboard structure covers the pointing device, and (2) a rearwardly shifted use orientation in which the pointing device is exposed for user operation thereof. Preferably the keyboard structure, when shifted to its use orientation, is upwardly and rearwardly tilted relative to the top base housing side. A latch structure is also preferably provided and is operative to releasably retain the keyboard structure in its use orientation.

Due to this vertical stacking of the keyboard structure and pointing device, the front-to-rear dimension of the computer base housing may be advantageously reduced. Additionally, due to the rearwardly and upwardly tilted use orientation of the keyboard structure its user operating comfort is enhanced.

In one embodiment of the notebook computer the keyboard structure has a generally flat configuration and has a pair of horizontally projecting mounting pins on front corner portions thereof. The mounting pins are received in corresponding front-to-rear extending grooves in the base housing to permit the keyboard structure to be shifted between its tilted use orientation and its storage/transport orientation. A rear portion of the keyboard structure is supported on a pivotal support plate member through which a ribbon cable member extends, the ribbon cable electrically coupling the keyboard structure to the electronics within the base housing.

When the keyboard structure is in its storage transport orientation it is recessed into a top side cutout area in the base housing. To facilitate the subsequent manual shifting of the keyboard structure to its tilted use orientation, a spring structure within the base housing upwardly biases a rear side of the keyboard structure so that when the lid housing is opened, a rear side portion of the keyboard structure is resiliently moved a shore distance above the level of the rear side of the cutout area. When the keyboard structure is subsequently shifted to its storage and transport orientation, and the lid housing is closed, the closed lid housing pushes the rear side of the keyboard structure into the cutout area against the resilient upward force of the spring structure.

In an alternate embodiment of the notebook computer, the keyboard has an upwardly dished configuration similar to that on many keyboard structures for desktop computers. The dished keyboard has mounting pin members that project outwardly therefrom and are slidably received in corresponding arcuate grooves in the base housing to permit to keyboard to be manually shifted along an arcuate path between its use and storage/transport orientations. The upwardly dished keyboard structure is electrically coupled to the electronics within the base housing via a ribbon cable member having a suitable service loop therein.

BRIEF DESCRIPTION OF THE DRAWINGS

FIG. 5A is a perspective view of an alternate embodiment of the notebook computer, with the computer being in its closed storage and transport orientation;

FIG. 5B is a perspective view of the alternate computer embodiment, with the computer being opened and its keyboard in its generally horizontal storage and transport orientation; and FIG. 5C is an enlarged scale simplified side elevational view of the alternate computer embodiment with its keyboard being rearwardly shifted to its rearwardly and upwardly tilted use orientation in which a pointing device previously covered by a front side portion of the keyboard is revealed for use.

DETAILED DESCRIPTION

Figure 1:
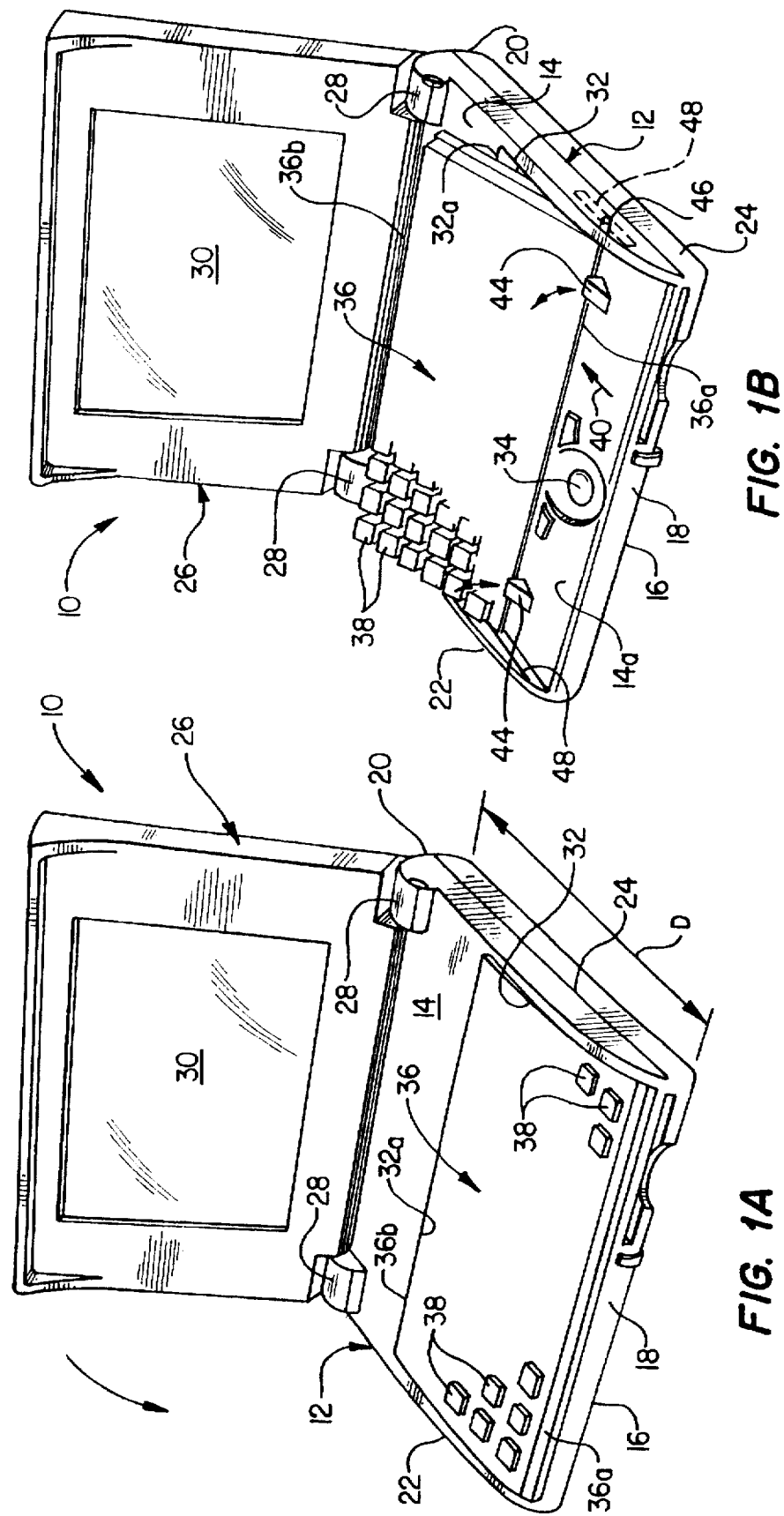
FIG. 1A is a perspective view of a notebook computer embodying principles of the present invention, with the computer being opened and with its keyboard in a generally horizontal storage and transport orientation.
FIG. 1B is a perspective view of the opened notebook computer with its keyboard being in its rearwardly and upwardly tilted use orientation in which a pointing device, previously covered by a front side portion of the keyboard is revealed for use.
Figure 2:
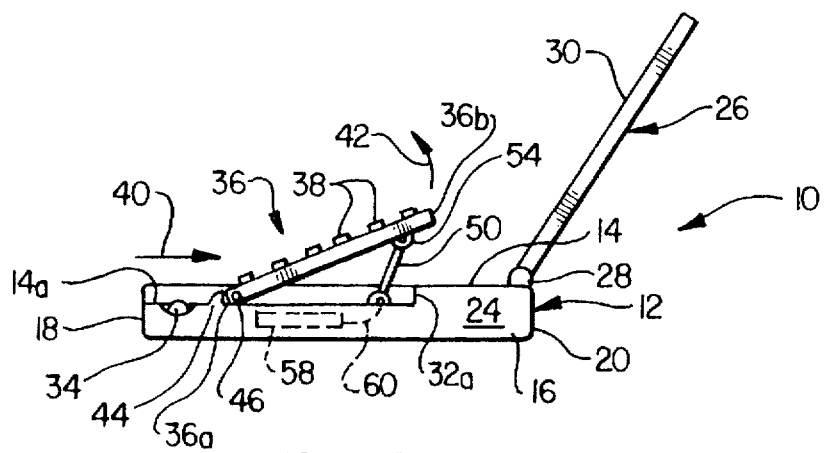
FIG. 2 is a reduced scale, highly schematic cross-sectional view through the opened computer of FIG. 1B.

Illustrated in FIGS. 1A–2 is a specially designed portable notebook computer 10 embodying principles of the present invention. Computer 10 includes a generally rectangular base housing 12 having top and bottom sides 14 and 16, front and rear sides 18 and 20, and opposite left and right sides 22 and 24. A somewhat thinner, generally rectangular lid housing 26 is secured to a top rear side of the base housing 12, by hinge structures 28, for pivotal movement relative to the base housing 12 between an upwardly tilted open position (shown in FIGS. 1A-2) in which the lid housing 26 is generally vertically oriented and exposes a display screen 30 to user view, and a downwardly pivoted closed position (not shown). A suitable latch mechanism of conventional construction (also not shown) is provided for releasably holding the lid housing 26 in its closed position in which it is generally parallel to and covers the top side 14 of the base housing 12.

As best shown in FIGS. 1B and 2, a front portion 14a of the top base housing side 14 extends along the bottom side of a generally rectangular cutout area 32 formed in the balance of the top side 14 and having a rear side edge 32a. Mounted on this downwardly offset front portion 14a, inwardly adjacent the front side 18 of the base housing 12, is a user operable control structure which is representatively in the form of a trackball pointing device 34 used to selectively reposition a movable cursor (not shown) displayed on the screen 30 during operation of the computer 10.

According to a primary aspect of the present invention, the computer 10 is provided with a keyboard structure 36, having individual keys 38, which is supported on the top side of the base housing 12. With the lid housing 26 in its illustrated upwardly pivoted open position the keyboard structure 36 is movable relative to the base housing 12 between (1) a forwardly shifted storage and transport orientation (FIG. 1A) in which the keyboard structure 36 is generally parallel to the top side of the base housing, with a front portion of the keyboard structure 36 extending over and covering the pointing device 34, and (2) a rearwardly shifted use orientation in which the keyboard structure 36 is in an upwardly and rearwardly tilted position and uncovers the pointing device 34 for user operation.

The keyboard structure 36 has a generally flat rectangular configuration, sized for a complementary fit within the cutout area 32 when the keyboard structure is in its FIG. 1A storage and transport orientation, and has opposite front and rear side edges 36a and 36b. When the keyboard structure 36 is rearwardly shifted to its use orientation, as indicated by the arrows 40,42 in FIGS. 1B and 2, spring-loaded detent members 44 pop up through corresponding openings in the top side portion 14a, in front of the front keyboard structure edge 36a, to releasably latch the keyboard structure in its use orientation. By simply pushing the resiliently biased detent members 44 down, the keyboard structure 36 may be manually shifted forwardly back to its FIG. 1A storage and transport orientation to permit the lid housing 26 to be closed.

Referring now to FIGS. 1B–4, opposite front side edges of the keyboard structure 36 have outwardly projecting mounting pins 46 disposed therein, the mounting pins being captively and slidingly retained in an opposite pair of front-to-rear extending grooves 48 formed in the base housing 12 as best illustrated in FIG. 1B. A generally rectangular mounting plate 50, having an internal passage 52 extending therethrough is pivotally secured at its upper side edge to suitable attachment members 54 mounted on the underside of a rear section of the keyboard structure 36, and is pivotally secured at its lower side edge to suitable attachment members 56 disposed within the cutout area 32.

When the keyboard structure is in its FIG. 1A storage and transport orientation the support plate 50 is disposed beneath and generally parallel to the keyboard structure, with the attachment members 54 being positioned forwardly of the attachment members 56. When the keyboard structure 36 is rearwardly shifted to its upwardly tilted use orientation the support plate 50 is pivoted in a clockwise direction to its FIG. 2 position in which it underlies and supports the now elevated rear section of the keyboard structure 36.

Figure 3:
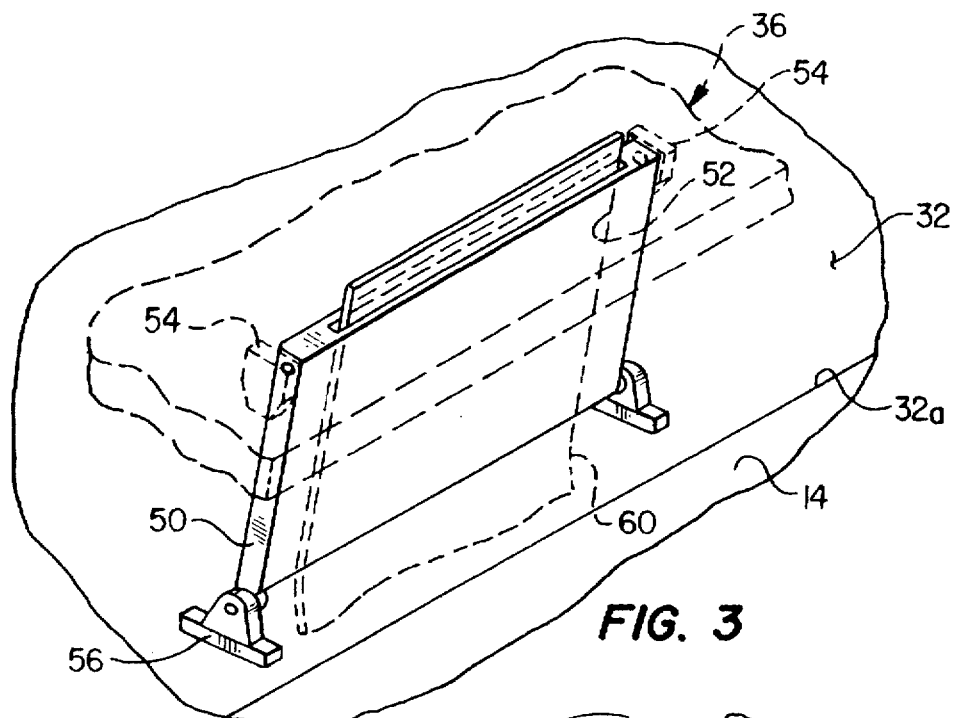
FIG. 3 is a simplified, partially phantomed enlarged scale perspective view of a pivotal keyboard support plate portion of the computer with its keyboard in its rearwardly and upwardly tilted FIG. 1B position.

As illustrated in FIGS. 2 and 3, the keyboard structure 36 is electrically coupled to electronic circuitry 58 (see FIG. 2) within the base housing 12 by means of a flexible ribbon cable member 60 that extends upwardly through the internal support plate passage 52 and is operatively connected at its opposite ends to the keyboard structure 36 and the electronic circuitry 58. The routing of the ribbon cable 60 through the support plate passage 52 serves to protect the portion of the cable disposed between the top side 14 of the base housing and the underside of the keyboard structure.

Figure 4:
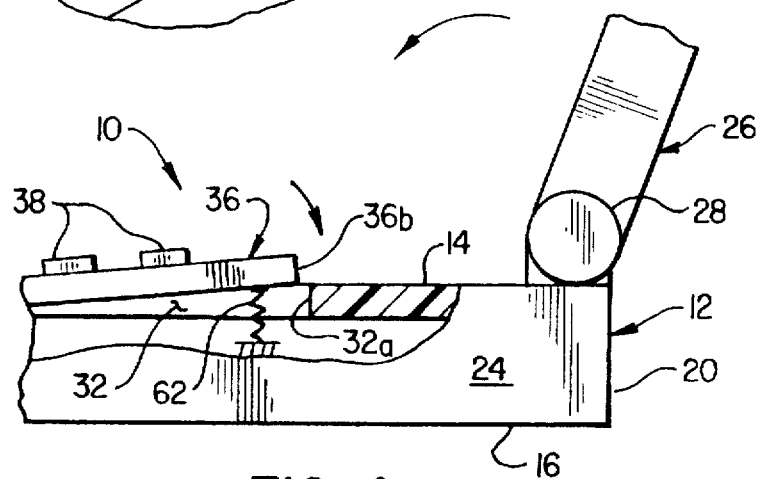
FIG. 4 is an enlarged scale partially cut away schematic side elevational view of the computer illustrating a resilient keyboard biasing portion thereof.

As illustrated in FIG. 4, with the lid housing 26 is in its open position and the keyboard structure 36 in its forwardly shifted storage and transport orientation a schematically depicted spring structure 62 disposed within the cutout area 32 underlies and resiliently biases a rear section of the keyboard structure 36 in a manner holding its rear side edge 36b just above the level of the top side 14 of the base housing 14. This facilitates the later rearward shifting of the keyboard structure 36 without causing the rear keyboard structure side edge 36b from striking and being interfered with by the rear side edge 32a of the cutout area 32. When the keyboard structure 36 is returned to its horizontal storage and transport orientation shown in FIG. 4, closure of the lid housing 26 causes it to downwardly engage the slightly upwardly projecting rear side section of the keyboard structure and push it down into the cutout area 32 against the resilient resistance of the spring structure 62.

The unique movable support of the keyboard structure 36 just described provides the computer 10 with several advantages over portable computers with conventional stationary support of their associated keyboard structures. First, the vertical stacking of a front portion of the keyboard structure 36 with the pointing device 34 (or other user operable control device such as a numerical keypad structure) permits the computer 10 to be constructed with a substantially shorter front-to-rear dimension D (see FIG. 1A) while still desirably placing the pointing device 34 in front of the keyboard structure during use of the computer.

Second, the palm rest portion 14a of the computer 10 in its FIG. 1B use orientation is positioned lower than the keyboard (and thus closer to the support surface upon which the computer is rested), thereby affording increased typing comfort.

Third, the upward and rearward tilting of the keyboard structure 36 in its FIG. 1B use orientation provides a further measure of typing comfort akin to that typically found in a desktop computer keyboard structure.

A second embodiment 10a of the previously described notebook computer 10 is illustrated in FIGS. 5A–5C. For purpose of ease in comparison to their counterparts in computer 10, components in the computer 10a similar to those in computer 10 have, for the most part, been given the same reference numerals but with the subscripts "a".

FIG. 5A shows the notebook computer 10a in its closed storage and transport orientation, and FIG. 5B shows the computer 10a opened to reveal an upwardly dished keyboard structure 70, having keys 38a, in its forwardly shifted storage and transport orientation in which a front side portion of the keyboard structure 70 covers a user operable control structure in the form of a pointing device 34a. Keyboard structure 70 has a front side edge 70a, and a rear side edge 70b, and is slidably supported on an upwardly dished front side portion 72a of the top side 72 of the base housing 12a, with the pointing device 34a also being mounted on the front side portion 72a rearwardly adjacent the front side 18a of the base housing 12a.

Adjacent each of the right and left sides 74,76 of the keyboard structure 70 are a spaced pair of downwardly projecting mounting members 78 (see FIG. 5C) which are slidably and captively retained within a spaced pair of arcuate grooves 80 formed in the upwardly dished front portion 72a of the top base housing side 72. This permits the keyboard structure 70 to be rearwardly shifted along an arcuate path indicated by the arrow 82 in FIG. 5C from its forwardly shifted FIG. 5B storage and transport orientation to its FIG. 5C rearwardly and upwardly tilted use orientation. When the keyboard structure 70 reaches its use orientation the detent members 44a pop up just forwardly of the front side edge 70a of the keyboard structure 70 to releasably retain it in its use orientation.

The keyboard structure 70 is electrically coupled to the electronic circuitry 58a within the base housing 12a by means of a flexible ribbon cable member 60a having the indicated service loop therein. When the keyboard structure 70 is moved to its FIG. 5B storage and transport orientation, and the lid housing 26a closed, a pair of outwardly projecting tabs 84 on the front side 86 of the lid housing 26a are brought into close adjacency with left and right top side edge portions 88,90 of the keyboard structure 70 to define shields that horizontally overlie and protect the keys 38a disposed adjacent these side edge portions 88 and 90.

As in the case of its previously described counterpart 10, the front-to-rear dimension of the notebook computer 10a may be reduced due to the unique vertical stacking of the pointing device 34a under the keyboard structure 70 in its forwardly shifted storage and transport orientation, the palm rest portion of the computer 10a is comfortably lowered relative to the keyboard structure 70 in its use orientation, and the keyboard structure provides enhanced typing comfort due to its rearwardly and upwardly tilted use orientation. The keyboard structure 70 provides further typing comfort due to its upwardly dished configuration.

The foregoing detailed description is to be clearly understood as being given by way of illustration and example only, the spirit and scope of the present invention being limited solely by the appended claims.

What is claimed is:

1. Electronic apparatus comprising:
    a housing having a top side with front and rear portions;
    a user operable control structure disposed on said front portion of said top side; and
    a keyboard structure supported on said top side for movement relative thereto between:
    (1) a forwardly shifted storage and transport orientation in which a front side portion of said keyboard structure covers said user operable control structure; and
    (2) a rearwardly shifted use orientation in which said user operable control structure is exposed for user operation thereof.

2. The electronic apparatus of claim 1 wherein said user operable control structure is a pointing device.

3. The electronic apparatus of claim 1 wherein said keyboard structure in said use orientation thereof is upwardly and rearwardly tilted relative to said top side of said housing.

4. The electronic apparatus of claim 3 wherein said electronic apparatus is a portable computer.

5. The electronic apparatus of claim 4 wherein:
    said portable computer is a notebook computer, and
    said housing is a base housing portion of said notebook computer.

6. The electronic apparatus of claim 1 wherein said keyboard structure has a generally flat configuration.

7. The electronic apparatus of claim 1 wherein said keyboard structure has an upwardly dished configuration.

8. The electronic apparatus of claim 1 further comprising a latch structure associated with said housing and operative to releasably hold said keyboard structure in said rearwardly shifted use orientation.

9. A portable computer comprising:
    a base housing having a top side with front and rear portions;
    a lid housing pivotally secured to said base housing for movement relative thereto between open and closed positions, said lid housing having a display screen thereon;
    a user operable control structure disposed on said front portion of said top side; and
    a keyboard structure supported on said top side for movement relative thereto between:
    (1) a forwardly shifted storage and transport orientation in which a front side portion of said keyboard structure covers said user operable control structure, and
    (2) a rearwardly shifted use orientation in which said user operable control structure is exposed for user operation thereof and said keyboard structure is upwardly and rearwardly tilted relative to said top side of said base housing.

10. The portable computer of claim 9 wherein said portable computer is a notebook computer.

11. The portable computer of claim 9 wherein said user operable control structure is a pointing device.

12. The portable computer of claim 9 further comprising a latch structure associated with said base housing and operative to releasably hold said keyboard structure in said rearwardly shifted use orientation.

13. The portable computer of claim 9 wherein said keyboard structure has a generally flat configuration.

14. The portable computer of claim 13 wherein:

a front section of said keyboard structure is slidably retained by said base housing for front-to-rear movement relative thereto, and said portable computer further comprises a support member having an upper end pivotally connected to a rear section of said keyboard structure and a lower end pivotally connected to said base housing.

15. The portable computer of claim 14 wherein said support member has a generally plate-shaped configuration.

16. The portable computer of claim 15 wherein:

said base housing has electronic circuitry therein, said support member has a passage extending therethrough between said upper and lower ends thereof, and said portable computer further comprises a ribbon cable member extending through said passage and electrically coupling said keyboard structure to said electronic circuitry.

17. The portable computer of claim 13 wherein:

said base housing has a cutout area formed in said top side thereof and having a rear edge portion, and said portable computer further comprises a spring structure operative to resiliently bias a rear section of said keyboard upwardly past said rear edge portion of said cutout area when said keyboard structure is in said storage and transport orientation thereof with said lid housing in said open position thereof.

18. The portable computer of claim 9 wherein:

said keyboard structure has an upwardly dished configuration, and said keyboard structure is slidably retained by said base housing for front-to-rear movement relative thereto along an arcuate path.

* * * * *